United States Patent [19]

Lauck et al.

[11] 4,158,722

[45] Jun. 19, 1979

[54] HIGH ENERGY ELECTROCHEMICAL CURRENT SOURCE

[75] Inventors: Helmut Lauck, Glashütten; Franz-Josef Kruger, Vockenhausen, both of Fed. Rep. of Germany

[73] Assignee: Varta Batterie Aktiengesellschaft, Hanover, Fed. Rep. of Germany

[21] Appl. No.: 911,284

[22] Filed: May 31, 1978

[30] Foreign Application Priority Data

Jun. 10, 1977 [DE] Fed. Rep. of Germany ....... 2726380

[51] Int. Cl.$^2$ .............................................. H01M 4/58
[52] U.S. Cl. ..................................... 429/194; 429/218
[58] Field of Search ................ 429/194, 196, 197, 218

[56] References Cited

U.S. PATENT DOCUMENTS

| 3,873,369 | 3/1975 | Kamenski | 429/194 |
| 3,998,658 | 12/1976 | Dey | 429/194 |

*Primary Examiner*—Charles F. LeFevour
*Attorney, Agent, or Firm*—Weiser, Stapler & Spivak

[57] ABSTRACT

In a galvanic element having a negative metal electrode, and non-aqueous electrolyte, the electrochemically reducible component of the positive electrode mass is a chromium oxide of the formula $CrO_x$, where x lies in the range between 2 and 2.9.

13 Claims, No Drawings

HIGH ENERGY ELECTROCHEMICAL CURRENT SOURCE

This invention relates to a galvanic element having a negative metal electrode, a non-aqueous electrolyte, and a positive metal oxide electrode.

Primary cells are known which have negative metal electrodes, a non-aqueous electrolyte and positive metal oxide electrodes. Because of their low equivalent weights and their high standard potentials, light metals used as electrode substances confer a particularly high energy density upon such cells. A particularly preferred position in this regard is occupied by lithium. The reactivity of the light metals permits only the use of non-aqueous electrolytes. On the other hand, the positive electrode must not dissolve in the electrolyte because, in that case, the usable capacity of such an electrode decreases greatly during storage.

A known group among the positive electrode materials in non-aqueous primary systems consists of several metal oxides, particularly heavy metal oxides. For example, U.S. Pat. No. 3,945,848 discloses the use of cobalt(III) oxide as positive electrode material. Furthermore, in German patent publication (Auslegungsschrift) No. 2,606,915 there are described primary cells with positive electrodes of copper(II) oxide, cobalt(III) oxide, vanadium(V) oxide and lead(II, IV) oxide.

All of these cells with positive metal oxide electrodes share the disadvantage of exhibiting only a relatively low discharge potential and therefore an energy density which is not high. In addition, the metal oxides have the disadvantage that they are somewhat soluble in the electrolyte,. As a result, after a more or less extended period of storage of the cells, the respective metals deposit upon the negative electrode causing a loss of capacity.

Accordingly, it is an object of the invention to provide a galvanic primary element which provides a high discharge potential, exhibits high energy density, and has a good shelf life.

These objects and others which will appear are achieved in accordance with the invention by utilizing for the electrochemically reducible component of the positive electrode mass a chromium oxide of the formula $CrO_x$, in which x is in the range between 2 and 2.9.

Preferably, a $CrO_x$ oxide is used in which x is limited to the range between 2.4 and 2.6.

This non-stoichiometrically constituted oxide is practically insoluble in the customary organic electrolyte solvents. Therefore, it provides the preconditions for good shelf life of cells having chromium oxide electrodes according to the invention. This property differentiates it favorably from pure chromium(VI) oxide, $CrO_3$, which is soluble, as well as from chromium(IV) oxide, $CrO_2$, whose discharge capacity is unsatisfactory. At the same time, the relatively high electronic conductivity of the chromium oxide according to the invention permits good mass utilization of the electrodes, which may be utilized with no, or only with little, conductive medium additive. Furthermore, in combination with negative metal electrodes, this oxide yields high discharge potentials. Finally, the chromium oxide according to the invention is easily and inexpensively derivable from chromium (VI) oxide.

As negative electrode metals, there may be used lithium, calcium, sodium, magnesium, aluminum, zinc, or alloys of these metals. However, preferably the lithium electrode is used because lithium delivers the highest energy per unit weight or volume.

Suitable electrolyte solvents are preferably organic solvents, which do not attack the active electrode substances and which have an electric conductivity of at least $10^{-4} \Omega^{-1} \cdot cm^{-1}$ after addition of a conductive salt. For example, the following solvents or mixtures of these solvents may be used:

propylene carbonate, $\gamma$-butyrolactone, dimethyl carbonate, ethylene glycol sulfite, dimethyl sulfite, tetrahydrofuran, dimethoxyethane, dioxolane and 3-methyl pyrrolidone.

Suitable conductive salts are for example salts of the following composition: $MBF_4$, $MClO_4$ and $MM'F_6$, wherein M is lithium, sodium or potassium and M' is phosphorus, arsenic or antimony. The concentrations of these conductive salts in the solvents lie between 0.5 and 2 Mol/l and preferably are 1 Mol/l.

The active positive electrode substance may be produced by thermal decomposition of chromium (VI) oxide in an oxygen stream. For example, chromium (VI) oxide is heated for about an hour, in a glass tube through which oxygen is piped, by means of an electrically heated oven at 340° C. After cooling, the substance is extracted with distilled water in order to remove undecomposed chromium (VI) oxide. Subsequently, the purified chromium oxide $CrO_x$ is dried at 120° C. in a vacuum.

The chromium oxide produced in this manner may, for example, be mixed with 0.5% by weight of carbon black and 0.5% by weight of a binding agent, for example polytetafluoroethylene powder, and pressed into tablets which form the positive electrodes of button cells. As negative electrodes, lithium tablets are used which are pressed into the cover of the button cell housing. Upon the positive electrodes there are placed discs of glass fiber matting which are about 0.3 mm thick and these are then saturated with the electrolyte together with the positive electrodes by drippings from a burette. The electrolyte consists of a 1 molar solution of lithium perchlorate in a mixture of 70 parts by volume of propylene carbonate and 30 parts by volume of dimethoxyethane. The cells are closed in conventional manner. They have an open-circuit potential of about 3.8 volts and a discharge potential of 3.5–2.8 volts at current loads of 0.2–0.5 mA/cm² of the positive electrode surface. Because of the resulting capacities, it may be assumed that the discharge reaction takes place in accordance with the following equation:

$$2 Li + 2 CrO_2 \rightarrow Li_2O + Cr_2O_3$$

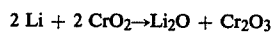

The oxide according to the invention is here formulated in simplified manner as stoichiometric chromium (IV) oxide $CrO_2$.

The current yields which are achieved reach 100% of the theoretical yields corresponding to that discharge reaction which is defined by the above reaction equation.

In a modified form of the invention the positive electrode mass can also consist of a mixture of $CrO_x$ with another metal oxide, for example $MnO_2$ or $PbO_2$. The only requirement is that this added oxide also be insoluble in the electrolyte solvent and have an oxidation potential similar to that of $CrO_x$. In the mixture the proportion of chromium oxide should always predominate and the admixture of an additional metal oxide should be so proportioned that the molar content of the chromium oxide in the mixture is always greater than 50%. For example, for each 1 Mol of added oxide, at least 2 Mols of chromium oxide should be utilized. It is immaterial in this regard whether the added oxide is admixed mechanically or whether both oxides are simultaneously produced by chemical transformation—decomposition of manganese carbonate with chromic acid —e.g. as shown by the equation $$MnCO_3 + 2\ H_2CrO_4 = MnO_2 + 2\ CrO_{2.5} + CO_2 + 2\ H_2O.$$

We claim:

1. A galvanic element having a negative metal electrode selected from the group of lithium, calcium, sodium, magnesium, aluminum, zinc, or alloys thereof, a non-aqueous electrolyte, and a positive metal oxide electrode wherein the electrochemically reducible component of the positive electrode mass is chromium oxide of the formula $CrO_x$ in which x is in the range between 2 and 2.9.

2. The element of claim 1 wherein the electrochemically reducible component of the positive electrode mass is a chromium oxide of the formula $CrO_x$ in which x is in the range between 2.4 and 2.6.

3. The element of claim 1 wherein the chromium oxide is present in mixture with another metal oxide whose oxidation potential approximates that of the chromium oxide.

4. The element of claim 3 wherein the other oxide is $MnO_2$.

5. The element of claim 1 wherein the electrolyte consists of an approximately 1 molar solution of a complex conductive salt selected from the group consisting of $MBF_4$, $MClO_4$ or $MM'F_6$, where M = Li, Na, K and M' = P, As, Sb, in a mixture of propylene carbonate and dimethoxyethane.

6. The element of claim 5 wherein the salt is $LiClO_4$.

7. The element of claim 5 wherein the salt is $LiAsF_6$.

8. The element of claim 1 wherein the positive electrode mass is mixed with approximately 0.5% by weight of carbon black and about 0.5% by weight of binding agent.

9. The element of claim 8 wherein the binding agent is polytetrafluoroethylene.

10. The element of claim 1 wherein the negative electrode is of lithium.

11. The element of claim 1 wherein
the chromiun oxide has been produced by thermal decomposition of chromium (VI) oxide in an oxygen stream.

12. The element of claim 11 wherein
the decomposition was performed heating chromium (VI) oxide for about one hour, in a glass tube through which oxygen is piped, at 340° C.

13. The element of claim 1 wherein
the positive electrode also includes in mixture with the $CrO_x$, $MnO_2$ or $PbO_2$, the $CrO_x$ being present in the mixture in a molar content greater than 50%.

* * * * *